(12) United States Patent
Kobayashi et al.

(10) Patent No.: US 12,281,675 B2
(45) Date of Patent: Apr. 22, 2025

(54) CLUTCH DEVICE AND MOTOR UNIT

(71) Applicant: Adamant Namiki Precision Jewel Co., Ltd., Tokyo (JP)

(72) Inventors: Yasuyuki Kobayashi, Aomori (JP); Ayumu Suto, Aomori (JP)

(73) Assignee: Orbray Co., Ltd., Tokyo (JP)

( * ) Notice: Subject to any disclaimer, the term of this patent is extended or adjusted under 35 U.S.C. 154(b) by 435 days.

(21) Appl. No.: 17/743,827

(22) Filed: May 13, 2022

(65) Prior Publication Data

US 2022/0268321 A1 Aug. 25, 2022

Related U.S. Application Data

(63) Continuation of application No. PCT/JP2020/043112, filed on Nov. 19, 2020.

(30) Foreign Application Priority Data

Nov. 20, 2019 (JP) ................. 2019-209463

(51) Int. Cl.
*F16D 11/14* (2006.01)
*F16D 7/04* (2006.01)
(Continued)

(52) U.S. Cl.
CPC ............ *F16D 11/14* (2013.01); *F16D 7/044* (2013.01); *F16D 43/20* (2013.01); *F16H 1/20* (2013.01)

(58) Field of Classification Search
CPC .......... F16D 11/14; F16D 7/044; F16D 43/20; F16H 1/20
(Continued)

(56) References Cited

U.S. PATENT DOCUMENTS 1,821,543 A * 9/1931 Coultas ................. F16D 47/02
464/39
5,834,878 A * 11/1998 Nakanishi ............. H02N 2/163
(Continued)

FOREIGN PATENT DOCUMENTS

CN 202997833 U 6/2013
JP S54-168700 U 11/1979
(Continued)

OTHER PUBLICATIONS

International Search Report dated Jan. 19, 2021 issued in Patent Application No. PCT/JP2020/043112.

*Primary Examiner* — Greg Binda
(74) *Attorney, Agent, or Firm* — Rankin, Hill & Clark LLP

(57) ABSTRACT

A clutch device includes: an input disk; an output disk; and a biasing member configured to press the input disk and the output disk against each other, the input disk and the output disk contact or separate from each other in an axial direction, and at opposing surfaces thereof, respectively have tooth portions engageable with or disengageable from each other, at each tooth portion, recessed and raised portions extending in a radial direction are alternately provided in a circumferential direction, each of the recessed and raised portions is formed so that a width in the circumferential direction may outwardly expands in the radial direction, and engagement force in the axial direction is greater on an inside of the tooth portions in the radial direction than on the outside when the tooth portions of the input disk and the output disk pressed by the biasing member are fitted in each other.

7 Claims, 4 Drawing Sheets

(51) Int. Cl.
*F16D 43/20* (2006.01)
*F16H 1/20* (2006.01)

(58) Field of Classification Search
USPC ..................................................... 464/38, 39
See application file for complete search history.

(56) References Cited

U.S. PATENT DOCUMENTS

| | | |
|---|---|---|
| 7,669,275 B2 | 3/2010 | Yagi |
| 9,759,270 B2 * | 9/2017 | Klassen ................. F16D 11/14 |
| 2006/0101603 A1 | 5/2006 | Yagi |
| 2018/0119755 A1 | 5/2018 | Sato et al. |
| 2019/0136948 A1 | 5/2019 | Palvoelgyi et al. |

FOREIGN PATENT DOCUMENTS

| | | |
|---|---|---|
| JP | H05-058959 U | 8/1993 |
| JP | 2006-322466 A | 11/2006 |
| JP | 2018-179048 A | 11/2018 |
| JP | 2019-113179 A | 7/2019 |
| WO | 2017-002464 A1 | 1/2017 |

\* cited by examiner

CLUTCH DEVICE AND MOTOR UNIT

CROSS-REFERENCE TO RELATED APPLICATION

The present application is a continuation application of International Application No. PCT/JP2020/043112, filed on Nov. 19, 2020, which claims priority to Japanese Patent Application No. 2019-209463, filed on Nov. 20, 2019. The contents of these applications are incorporated herein by reference in their entirety.

BACKGROUND

1. Technical Field

One aspect of the present disclosure relates to a clutch device and a motor unit using the clutch device.

2. Related Art

Typically, there has been a clutch device configured to block a power transmission path when an excessive rotation load acts on an output shaft (see, e.g., WO 2017/002464 A). This clutch device includes, for example, an input disk, an output disk, and a biasing member configured to press the input disk against the output disk, such as a spring. In a case where a predetermined load or greater is received, the input disk and the output disk are separated from each other against biasing force of the biasing member.

In the clutch device described in WO 2017/002464 A, tooth portions (61a, 62a) overlapping with each other and formed engageable with or disengageable from each other in an axial direction are provided at opposing surfaces of the input disk (61) and the output disk (62). At each tooth portion (61a, 62a), recessed portions (1) and raised portions (2) extending in a radial direction are alternately provided in a circumferential direction. Each of the recessed portions (1) and the raised portions (2) is formed in such a curved surface that a width (W) in the circumferential direction continuously expands toward the outside in the radial direction while the same height is maintained.

This clutch device has the above-described configuration so that, e.g., deformation and damage of engagement-disengagement portions can be reduced, and therefore, has excellent durability. Moreover, even if this clutch device is relatively small, a clutch torque capacity can be ensured. Thus, a small motor unit including this clutch device has been achieved. This motor unit has been used for driving, e.g., a joint of an arm or leg of a palm-sized small robot or a node of a robot hand so that the safety of the robot and the like can be enhanced.

SUMMARY

A clutch device includes: an input disk to be rotated by drive force from an input side; an output disk configured to transmit rotation of the input disk to an output side; and a biasing member configured to press the input disk and the output disk against each other. The input disk and the output disk are provided so as to contact or separate from each other in an axial direction. The input disk and the output disk respectively have, at opposing surfaces thereof, tooth portions engageable with or disengageable from each other in association with contact or separation of the input disk and the output disk. At each tooth portion, recessed and raised portions extending in a radial direction are alternately provided in a circumferential direction. Each of the recessed and raised portions is formed in such a curved surface that a width in the circumferential direction continuously expands toward an outside in the radial direction. Engagement force in the axial direction is greater on an inside of the tooth portions in the radial direction than on the outside in a state in which the tooth portions of the input disk and the output disk are fitted in each other by pressing by the biasing member.

DETAILED DESCRIPTION

Figure 1:
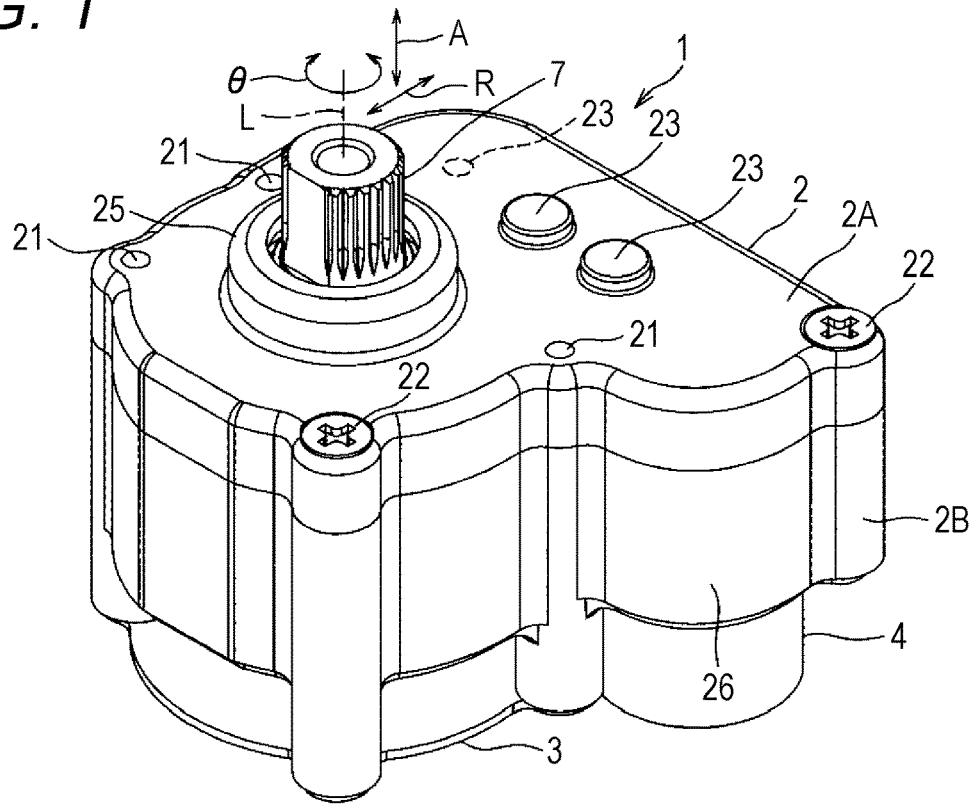
FIG. 1 is a perspective view showing a motor unit according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As the characteristics of an equi-depth tooth clutch configured such that tooth portions of an input disk and an output disk have an equal height, such as the clutch device described in WO 2017/002464 A, characteristics that the pressure angle of a tooth surface is smaller on an inner peripheral side than on an outer peripheral side and most of clutch torque is transmitted on the inner peripheral side have been known. However, due to manufacturing reasons, teeth are less likely to uniformly engage with each other. For this reason, the clutch torque is less likely to increase if the teeth strongly engage with each other on the outer peripheral side. Thus, it is difficult for each product to stably provide the clutch torque.

One object of the present disclosure is to provide a clutch device capable of stably providing clutch torque and a motor unit including the clutch device.

A clutch device according to one aspect of the present disclosure (the present clutch device) includes: an input disk to be rotated by drive force from an input side; an output disk configured to transmit rotation of the input disk to an output side; and a biasing member configured to press the input disk and the output disk against each other. The input disk and the output disk are provided so as to contact or separate from each other in an axial direction. The input disk and the output disk respectively have, at opposing surfaces thereof, tooth portions engageable with or disengageable from each other in association with contact or separation of the input disk and the output disk. At each tooth portion, recessed and raised portions extending in a radial direction are alternately provided in a circumferential direction. Each of the recessed and raised portions is formed in such a curved surface that a width in the circumferential direction continuously expands toward an outside in the radial direction. Engagement force in the axial direction is greater on an inside of the tooth portions in the radial direction than on the outside in a state in which the tooth portions of the input disk and the output disk are fitted in each other by pressing by the biasing member.

According to the present clutch device, each of the recessed and raised portions of the tooth portions of the input disk and the output disk is formed in such a curved surface that the width in the circumferential direction continuously expands toward the outside in the radial direction. Moreover, the present clutch device is configured such that the engagement force in the axial direction is greater on the inside of the tooth portions in the radial direction than on the outside in a state in which these tooth portions are fitted in each other. With this configuration, clutch torque is favorably transmitted on the inside of the tooth portions in the radial direction. Thus, the present clutch device can stably provide the clutch torque.

In the present clutch device, it is preferable that at least one of the input disk or the output disk is elastically deformable by pressing force of the biasing member such that an inner portion of the at least one disk in the radial direction approaches another one of the input disk or the output disk.

According to this configuration, at least one of the input disk or the output disk is elastically deformable by the pressing force of the biasing member such that the inner portion the at least one disk in the radial direction approaches the other disk. With this configuration, the engagement force is greater on the inside of the tooth portions in the radial direction, and therefore, the clutch torque can be stabilized.

Moreover, it is preferable that the tooth portions are provided at outer peripheral portions of the input disk and the output disk, and a hollow portion at which the input disk and the output disk separate from each other is provided on the inside of the tooth portions in the radial direction.

According to this configuration, the hollow portion is provided between the input disk and the output disk on the inside of the tooth portions of the outer peripheral portions in the radial direction. With this configuration, the inner portion of at least one of the input disk or the output disk in the radial direction is easily deformable toward the other one of the input disk or the output disk.

Moreover, it is preferable that the input disk receives the pressing force from the biasing member through an intermediate member having a higher stiffness than that of the input disk.

According to this configuration, the input disk receives the pressing force from the biasing member through the intermediate member having a higher stiffness than that of the input disk. With this configuration, the pressing force on the input disk from the biasing member can be favorably transmitted.

In this case, it is preferable that the intermediate member has a contact surface configured to surface-contact a back side of the tooth portion of the input disk to transmit the pressing force from the biasing member.

According to this configuration, the contact surface of the intermediate member surface-contacts the back side of the tooth portion of the input disk to transmit the pressing force from the biasing member. With this configuration, the pressing force from the biasing member can be more favorably transmitted to the tooth portion of the input disk.

Moreover, it is preferable that the output disk is coupled to an output member having a higher stiffness than that of the output disk, and the output member is fixed to the output disk at a position apart from the tooth portion of the output disk to a center in the radial direction.

According to this configuration, the output member is fixed to the output disk at the position apart from the tooth portion of the output disk to the center in the radial direction. With this configuration, the inner portion of the output disk in the radial direction is deformed toward the input disk between the tooth portion and the fixed position of the output member. Thus, the engagement force on the inside of the tooth portions in the radial direction can be increased.

In this case, it is preferable that the output disk has an insertion hole into which the output member is to be inserted, and the output member has a shaft portion to be inserted into the insertion hole of the output disk and an annular protruding portion protruding from the shaft portion in the radial direction to contact the output disk from an opposite side of the input disk.

According to this configuration, the output member has the shaft portion to be inserted into the insertion hole of the output disk and the annular protruding portion protruding from the shaft portion in the radial direction to contact the output disk from the opposite side of the input disk. With this configuration, the pressing force from the biasing member can be favorably transmitted to the output member while displacement of the output disk and the output member in the axial direction is reduced.

A motor unit according to one aspect of the present disclosure (the present motor unit) includes: a motor having a rotor shaft; a gear mechanism configured to transmit rotation of the rotor shaft; a driven gear to be rotated by transmission of the rotation of the rotor shaft from the gear mechanism; and the present clutch device transmitting the rotation to an output shaft on an output side from the driven gear on an input side.

According to the present motor unit, the clutch torque can be stably provided by the present clutch device. Thus, the present motor unit can enhance the safety of, e.g., a robot when used for driving, e.g., a joint of a small robot or a node of a robot hand.

The present clutch device is configured such that the engagement force on the inside of the tooth portions in the radial direction is greater than the engagement force on the outside. With this configuration, the present clutch device can stably provide the clutch torque.

Figure 2:
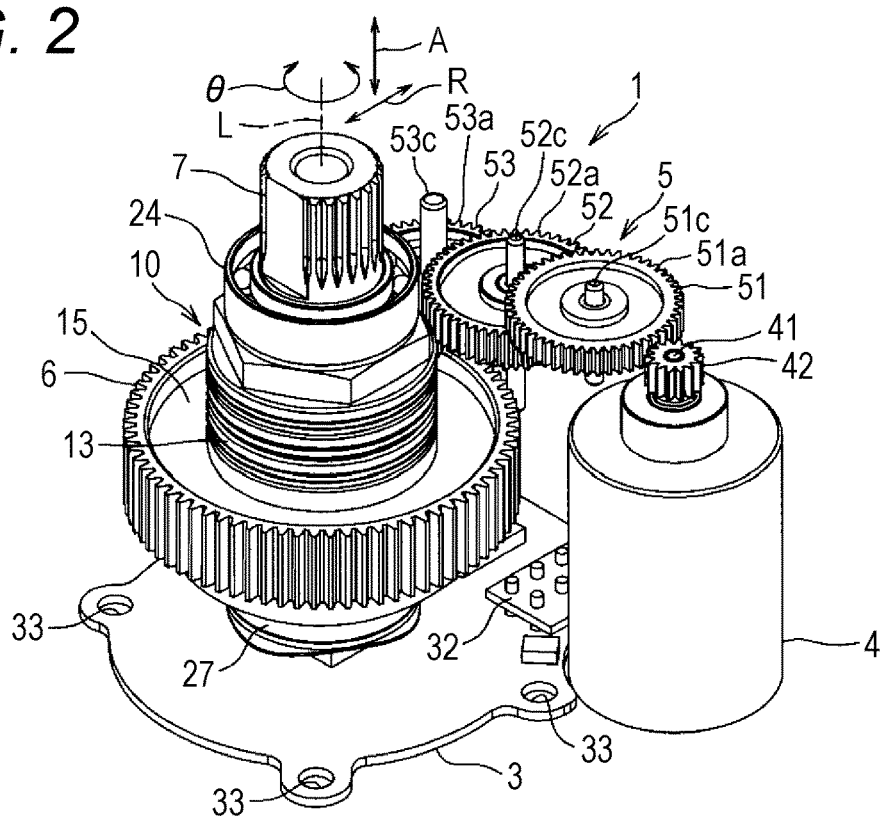
FIG. 2 is a perspective view showing an internal structure of the motor unit.
Figure 3:
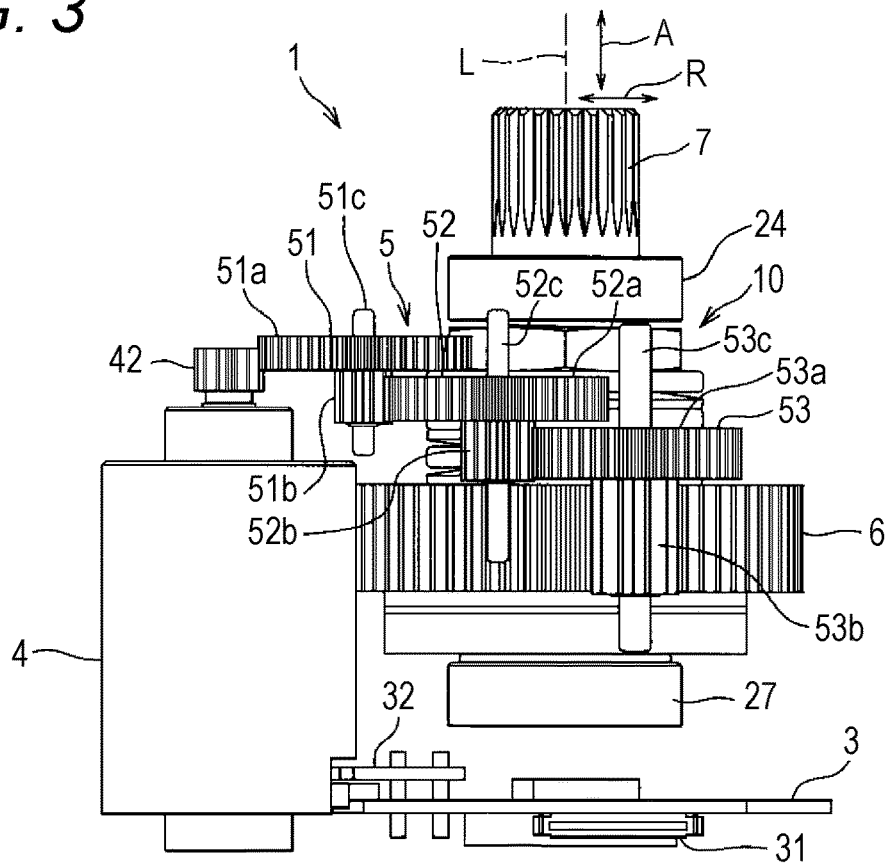
FIG. 3 is a side view showing the internal structure of the motor unit.
Figure 4:
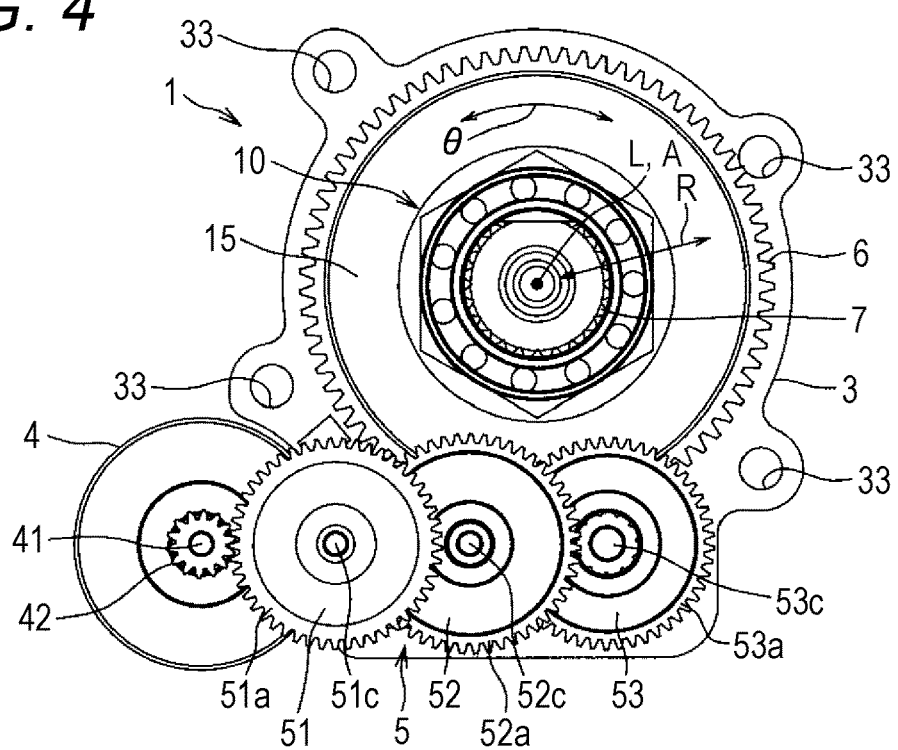
FIG. 4 is a plan view showing the internal structure of the motor unit.
Figure 5:
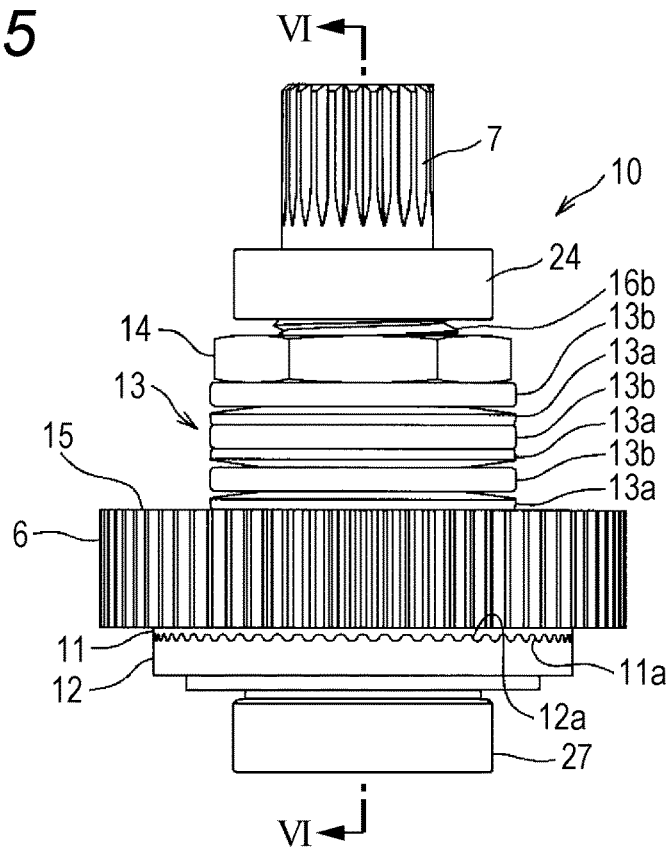
FIG. 5 is a side view showing a clutch device used for the motor unit.
Figure 6:
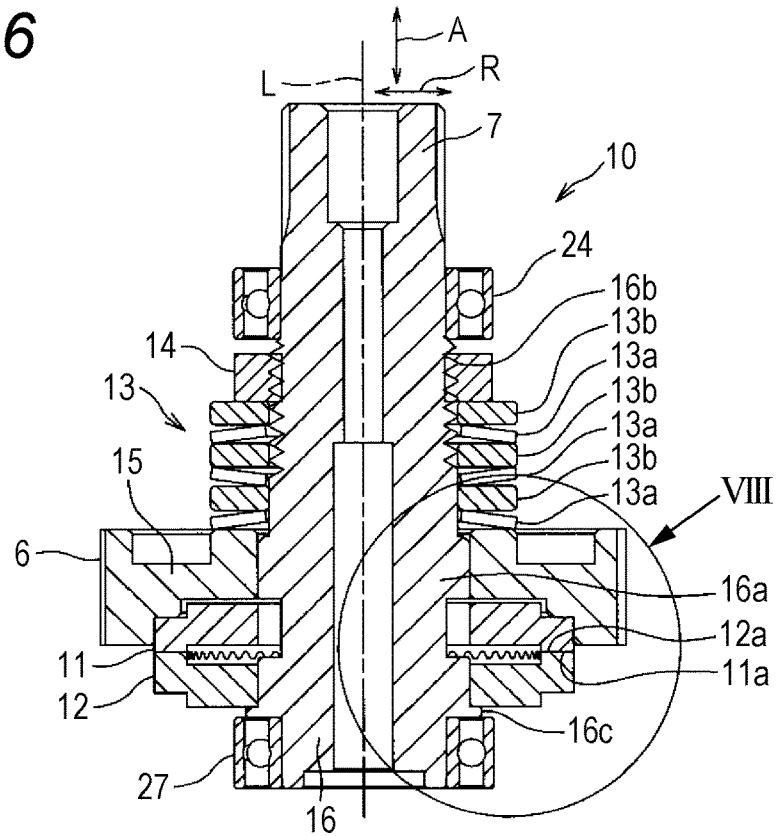
FIG. 6 is a sectional view showing the clutch device at a position indicated by a sectional line VI-VI in FIG. 5.

A motor unit and a clutch device according to one embodiment of the present disclosure will be described based on FIGS. 1 to 8. As shown in FIGS. 1 to 3, the motor unit 1 of the present embodiment includes a case 2, a control board 3, a motor 4, a gear mechanism 5, a driven gear 6, an output shaft 7, and the clutch device 10. Note that in description below, an axial direction A is an up-down direction in FIG. 3 and means a direction along the axis L (the center of rotation) of the output shaft 7. A radial direction R means a direction perpendicular to the axis L of the output shaft 7. A circumferential direction θ means the direction of rotation about the axis L of the output shaft 7. Moreover, in description below, an expression such as "up-down," "upper," or "lower" will be sometimes used based on the up-down direction in FIG. 3. Such an expression such as "up-down" is used for simple description, and is not for specifying and limiting an installation state of the motor unit 1.

As shown in FIG. 1, the case 2 has a resin upper case 2A, a resin lower case 2B, and multiple fixing screws 22 fixing the upper case 2A and the lower case 2B to each other. The upper case 2A has screw holes 21 for attachment to an external structure, multiple pivotally-support portions 23 pivotally supporting an upper end side of the gear mechanism 5, a bearing 24 rotatably supporting an upper end side of the output shaft 7, and an insertion portion 25 holding the bearing 24 with the output shaft 7 being inserted into the insertion portion 25. The lower case 2B has a motor holding portion 26 holding the motor 4, multiple pivotally-support portions (not shown) pivotally supporting a lower end side of the gear mechanism 5, a bearing 27 rotatably supporting a lower end side of the output shaft 7, and a holding portion (not shown) holding the bearing 27. The upper case 2A and the lower case 2B are fixed to each other in such a manner that the fixing screws 22 at three locations are screwed into the lower case 2B with penetrating the upper case 2A.

As shown in FIGS. 2 and 3, the control board 3 is a resin plate-shaped member. The control board 3 has a connector 31 to which a power line or a signal line from a power source or a controller is to be connected, a motor connection portion 32 supplying power to the motor 4 and supporting the motor 4, and multiple (four locations) screw fixing portions 33 through which the fixing screws 22 penetrate. The motor 4 is a brushless DC motor. The motor 4 has a rotor shaft 41 and a drive gear (a pinion) 42 fixed to the rotor shaft 41. The motor 4 may be replaced with various motors other than the brushless DC motor, such as a stepping motor or a brushed coreless motor. The gear mechanism 5 has first to third gears 51, 52, 53. In the first to third gears 51, 52, 53, large gears (gears) 51a, 52a, 53a and small gears (pinions) 51b, 52b, 53b are, respectively, integrally coupled to each other. Of each of rotary shafts 51c, 52c, 53c of the first to third gears 51, 52, 53, an upper end portion is pivotally supported on the pivotally-support portion 23 of the upper case 2A, and a lower end portion is pivotally supported on the pivotally-support portion (not shown) of the lower case 2B. The rotor shaft 41 of the motor 4 and the rotary shafts 51c, 52c, 53c of the first to third gears 51, 52, 53 are provided parallel with the axis L of the output shaft 7, i.e., along the axial direction A.

In the first gear 51, the large gear 51a thereof engages with the drive gear 42 of the motor 4. The first gear 51 rotates in association with rotation of the rotor shaft 41. In the second gear 52, the large gear 52a thereof engages with the small gear 51b of the first gear 51. The second gear 52 rotates in association with rotation of the first gear 51. In the third gear 53, the large gear 53a thereof engages with the small gear 52b of the second gear 52. The third gear 53 rotates in association with rotation of the second gear 52. The driven gear 6 engages with the small gear 53b of the third gear 53. In association with rotation of the third gear 53, the driven gear 6 rotates. As described above, the gear mechanism 5 forms a reduction gear train transmitting, by the first to third gears 51, 52, 53, rotation of the rotor shaft 41 of the motor 4 to the driven gear 6 and transmitting rotation to the driven gear 6 while sequentially decreasing the rotation speed of the rotor shaft 41. The driven gear 6 is formed integrally with an outer peripheral portion of an intermediate member 15 of the clutch device 10. By rotation of the rotor shaft 41 of the motor 4, the output shaft 7 rotates through the clutch device 10. Accordingly, a not-shown drive target (such as a joint of a robot) coupled to the output shaft 7 is driven.

Next, the configuration of the clutch device 10 will be described in detail with reference to FIGS. 5 to 8. The clutch device 10 includes an input disk 11, an output disk 12, a biasing member 13, a fixing member 14, the intermediate member 15, and an output member 16. The clutch device 10 directly transmits rotary drive force, which has been transmitted from the motor 4 on an input side through the gear mechanism 5 and the driven gear 6, to the output shaft 7 by integral rotation of the input disk 11 and the output disk 12. On the other hand, when an excessive rotation load acts between the drive target on an output side and the input side, the clutch device 10 operates to block a power transmission path between the input and output sides by relative rotation (relative sliding) of the input disk 11 and the output disk 12, thereby reducing transmission of the rotary drive force to the output shaft 7 and the drive target.

The input disk 11 is fixed to the intermediate member 15 formed with the driven gear 6 at an outer peripheral portion, and is rotated by the drive force from the input side. The output disk 12 is fixed to the output member 16 provided integrally with the output shaft 7 on an extension of the axis L of the output shaft 7, and transmits the rotary drive force from the input disk 11 to the output side. The input disk 11 and the output disk 12 are provided so as to contact or separate from each other in the axial direction A, and are biased in the direction of approaching each other by pressing force from the biasing member 13. Moreover, the input disk 11 and the output disk 12 have, at opposing surfaces 11b, 12b thereof, tooth portions 11a, 12a engageable with or disengageable from each other in association with contact or separation of the input disk 11 and the output disk 12 (see FIG. 7). The input disk 11 and the output disk 12 as described above are integrally rotatable in a state in which the tooth portions 11a, 12a are fitted in each other, and are relatively rotatable by detachment of the tooth portions 11a, 12a fitted in each other. In a state in which the tooth portions 11a, 12a of the input disk 11 and the output disk 12 are fitted in each other, a hollow portion 17 at which the opposing surfaces 11b, 12b separate from each other is formed inside the tooth portions 11a, 12a in the radial direction R (see FIG. 8), and therefore, the input disk 11 and the output disk 12 contact each other only at the tooth portions 11a, 12a.

The biasing member 13 has multiple (three) disc springs 13a and multiple (three) spacers 13b. The disc springs 13a and the spacers 13b are alternately stacked on each other. The disc spring 13a and the spacer 13b are formed in a circular ring shape, and a shaft portion 16a of the output member 16 is inserted into the disc springs 13a and the spacers 13b. The biasing member 13 is fixed by the fixing member (a nut) 14 screwed onto an external thread portion 16b formed at the shaft portion 16a of the output member 16. The fixing member 14 is fastened toward the intermediate member 15, and accordingly, the pressing force acts on the intermediate member 15 and the input disk 11 from the biasing member 13. The force (torque) of fastening the fixing member 14 is adjusted so that the pressing force of the biasing member 13 can be adjusted. The disc springs 13a and the spacers 13b of the biasing member 13 are provided so as to slide on each other. Thus, in a case where the intermediate member 15 and the input disk 11 rotate relative to the output member 16, the biasing member 13 can follow rotation of the intermediate member 15.

The intermediate member 15 is entirely formed in a circular ring shape by, e.g., cutting of a metal material such as stainless alloy. The shaft portion 16a of the output member 16 is inserted into the intermediate member 15. Accordingly, the intermediate member 15 is supported on the shaft portion 16a of the output member 16 so as to rotate about the axis L. The intermediate member 15 and the input disk 11 rotate integrally with the output member 16 and the output shaft 7 in a state in which the tooth portions 11a, 12a of the input disk 11 and the output disk 12 are fitted in each other. On the other hand, in a case where the tooth portions 11a, 12a fitted in each other are detached from each other, the intermediate member 15 is guided by the shaft portion 16a of the output member 16, and the intermediate member 15 and the input disk 11 rotate relative to the output member 16, the output shaft 7, and the output disk 12 about the axis L. Thus, the rotary drive force transmitted to the driven gear 6 from the motor 4 through the gear mechanism 5 is not transmitted to the output shaft 7.

Figure 8:
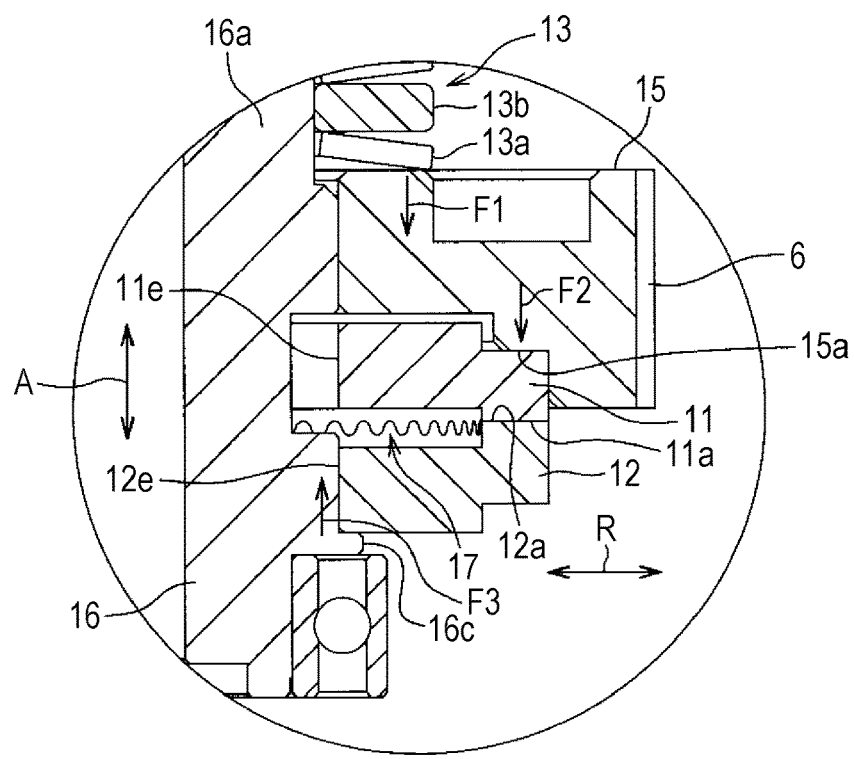
FIG. 8 is an enlarged sectional view showing part of the clutch device and showing a portion indicated by an enclosure VIII in FIG. 6.

The output member 16 and the output shaft 7 are integrally entirely formed in a circular columnar shape (or a cylindrical shape) by, e.g., cutting of a metal material such as a stainless alloy. A spline and a D-cut are formed on an output shaft 7 side, i.e., a tip end side of the column (or the cylinder). On a base end side of the output member 16, an annular protruding portion 16c protruding outwardly from the shaft portion 16a in the radial direction R to contact the output disk 12 from the opposite side of the input disk 11 is formed. As shown in FIG. 8, a contact surface 15a configured to surface-contact a back side of the tooth portion 11a of the input disk 11 to transmit the pressing force from the biasing member 13 to the input disk 11 is formed at the intermediate member 15. Note that the output member 16 and the output shaft 7 are not necessarily integrally formed. The output member 16 and the output shaft 7 may be, after having been separately formed, coupled and fixed to each other, or may be coupled to each other through other members.

Figure 7:
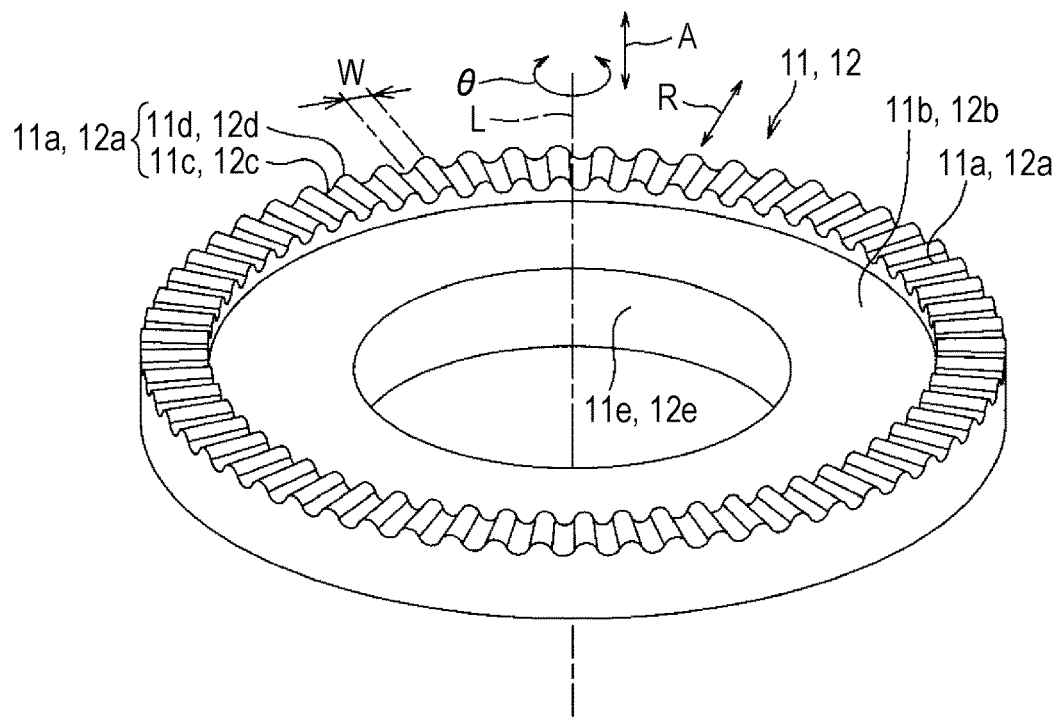
FIG. 7 is a perspective view showing an input or output disk in the clutch device.

As shown in FIG. 7, the input disk 11 and the output disk 12 are entirely formed in a discoid shape about the axis L. At the centers of the input disk 11 and the output disk 12, insertion holes 11e, 12e into which the shaft portion 16a of the output member 16 are to be inserted are formed. The tooth portions 11a, 12a of the input disk 11 and the output disk 12 are respectively formed in such a manner that recessed portions 11c, 12c and raised portions 11d, 12d extending in the radial direction R are, respectively, alternatively provided in the circumferential direction θ. Each of the recessed portions 11c, 12c and the raised portions 11d, 12d is formed in such a curved surface that a width W in the circumferential direction θ continuously expands toward the outside in the radial direction R. Moreover, each of the recessed portions 11c, 12c and the raised portions 111d, 12d is formed to have an equal height in the axial direction A along the radial direction R. Thus, the pressure angle of a tooth surface of the tooth portion 11a, 12a is smaller on an inner peripheral side than on an outer peripheral side in the radial direction R.

As shown in FIG. 8, the input disk 11 is held on the intermediate member 15 in a state in which an outer peripheral surface thereof is fixed to the intermediate member 15 and the contact surface 15a of the intermediate member 15 surface-contacts the back side of the tooth portion 11a. The output disk 12 is held on the output member 16 in a state in which an inner peripheral surface of the insertion hole 12e is fixed to the shaft portion 16a of the output member 16 and the annular protruding portion 16c of the output member 16 contacts the output disk 12 from the opposite side of the input disk 11. Pressing force F1 acting on the intermediate member 15 from the biasing member 13 acts on the input disk 11 and the output disk 12. That is, the pressing force F1 is, as pressing force F2, transmitted to the back side of the tooth portion 11a of the input disk 11 from the contact surface 15a. The pressing force F2 is transmitted to the output disk 12 through the tooth portions 11a, 12a, and as internal member stress of the output disk 12, is transmitted to the inner peripheral side. Accordingly, pressing force F3 is transmitted to the output disk 12 through the shaft portion 16a and the annular protruding portion 16c.

As described above, the pressing force F1 from the biasing member 13 is, as the pressing forces F2, F3, transmitted to the input disk 11 and the output disk 12. Accordingly, the output disk 12 is elastically deformed such that an inner portion thereof in the radial direction R approaches the input disk 11. That is, the pressing forces F2, F3 act on the output disk 12 from different positions in the radial direction R. and therefore, the output disk 12 is elastically deformed such that the inner portion thereof in the radial direction R bends toward the input disk 11 along an out-of-plane direction (the axial direction A). The intermediate member 15 and the output member 16 as described herein have a relatively-high stiffness than that of the input disk 11 and the output disk 12. Thus, the amount of deformation of the intermediate member 15 and the output member 16 is negligibly smaller as compared to the amount of elastic deformation of the output disk 12. Moreover, the input disk 11 transmits the pressing force F2, which has been received from the contact surface 15a on the back side of the tooth portion 11a, to the tooth portion 12a of the output disk 12 on a front side of the tooth portion 11a. Thus, the amount of deformation of the input disk 11 is also negligibly small.

As described above, the output disk 12 is elastically deformed by the pressing forces F1, F2, F3 from the biasing member 13 such that the inner portion of the output disk 12 in the radial direction R approaches the input disk 11. Accordingly, engagement force in the axial direction A is greater on the inside of the tooth portions 11a, 12a in the radial direction R than on the outside. Note that for enhancing the stiffness of the intermediate member 15 and the output member 16 as compared to that of the input disk 11 and the output disk 12, e.g., the sectional dimensions (e.g., plate thicknesses or shaft diameters) of the intermediate member 15 and the output member 16 may be relatively increased or materials having a relatively-high elastic modulus may be used as the materials of the intermediate member 15 and the output member 16. For example, in a case where the materials of the intermediate member 15 and the output member 16 are alloy steel such as SUS, e.g., titanium alloy, brass, aluminum alloy, or a resin material may be employed as the materials of the input disk 11 and the output disk 12. In a case where the materials of the intermediate member 15 and the output member 16 are brass, e.g., aluminum alloy or a resin material may be employed as the materials of the input disk 11 and the output disk 12. Alternatively, the materials of the intermediate member 15 and the output member 16 may be aluminum alloy, and the materials of the input disk 11 and the output disk 12 may be a resin material. In a case where the sectional dimensions of the intermediate member 15 and the output member 16 are relatively greater than the sectional dimensions of the input disk 11 and the output disk 12, these components may be made of the same material.

As described above, according to the present embodiment, in the clutch device 10, each of the recessed portions 11c, 12c and the raised portions 11d, 12d of the tooth portions 11a, 12a of the input disk 11 and the output disk 12 is formed in such a curved surface that the width W in the circumferential direction θ continuously expands toward the outside in the radial direction R. Moreover, the clutch device 10 is configured such that the engagement force in the axial direction A is greater on the inside of the tooth portions 11a, 12a in the radial direction R than on the outside in a state in which the tooth portions 11a, 12a are fitted in each other. With this configuration, the clutch torque is favorably transmitted inside the tooth portions 11a, 12a in the radial direction R. Thus, the clutch device 10 can stably provide the clutch torque.

In the clutch device 10, the output disk 12 is elastically deformed by the pressing force of the biasing member 13 such that the inner portion of the output disk 12 in the radial direction R approaches the input disk 11. With this configuration, the engagement force is greater on the inside of the tooth portions 11a, 12a in the radial direction R, and therefore, the clutch torque can be stabilized. Further, in the clutch device 10, the hollow portion 17 is provided between the input disk 11 and the output disk 12 on the inside of the tooth portions 11a, 12a of the outer peripheral portions in the radial direction R. With this configuration, the inner portion of the output disk 12 in the radial direction R is easily deformable toward the input disk 11.

In the clutch device 10, the input disk 11 receives the pressing force from the biasing member 13 through the intermediate member 15 having a higher stiffness than that of the input disk 11. With this configuration, the pressing force on the input disk 11 from the biasing member 13 can be favorably transmitted. Further, the contact surface 15a of the intermediate member 15 surface-contacts the back side of the tooth portion 11a of the input disk 11, thereby transmitting the pressing force from the biasing member 13. With this configuration, the pressing force from the biasing member 13 can be more favorably transmitted to the tooth portion 11a of the input disk 11.

In the clutch device 10, the shaft portion 16a of the output member 16 and the output disk 12 are fixed to each other at a position apart from the tooth portion 12a of the output disk 12 to the center in the radial direction R. With this configuration, the inner portion of the output disk 12 in the radial direction R is deformed toward the input disk 11 between the tooth portion 12a and the fixed position of the output member 16. Accordingly, the engagement force on the inside of the tooth portions 11a, 12a in the radial direction R can be increased. Further, the output member 16 has the shaft portion 16a inserted into the insertion hole 12e of the output disk 12 and the annular protruding portion 16c protruding from the shaft portion 16a in the radial direction R and contacting the output disk 12 from the opposite side of the input disk 11. With this configuration, the pressing force from the biasing member 13 can be favorably transmitted to the output member 16 while displacement of the output disk 12 and the output member 16 in the axial direction A is reduced.

Note that the technical scope of the present disclosure is not limited to the above-describe embodiment and includes other configurations and the like which can achieve the object of the present disclosure. The following variations and the like are also included in the technical scope of the present disclosure. For example, in the clutch device 10 of the above-described embodiment, the output disk 12 is elastically deformed by the pressing force of the biasing member 13 such that the inner portion of the output disk 12 in the radial direction R approaches the input disk 11, and therefore, the engagement force is greater on the inside of the tooth portions 11a, 12a in the radial direction R. On this point, the clutch device 10 may be configured such that the input disk 11 is elastically deformed by the pressing force of the biasing member 13 such that an inner portion of the input disk 11 in the radial direction R approaches the output disk 12. Alternatively, it may be configured such that both the input disk 11 and the output disk 12 are elastically deformed such that the inner portions thereof in the radial direction R approach each other. With these configurations, the engagement force on the inside of the tooth portions 11a, 12a in the radial direction R can be also increased.

In the above-described embodiment, the output disk 12 is elastically deformed by the pressing force of the biasing member 13, and accordingly, the engagement force becomes greater on the inside of the tooth portions 11a, 12a in the radial direction R. On this point, the configuration in which the engagement force is greater on the inside of the tooth portions 11a, 12a in the radial direction R than on the outside may include a configuration in which the height of the tooth portion on the inside in the radial direction R is set slightly higher than that on the outside at least at one of the input disk 11 or the output disk 12. With this configuration, the engagement force upon fitting of the tooth portions is also greater on the inside than on the outside. Further, surface treatment such as coating or surface roughening is performed for the inside (or the outside) of the tooth portions in the radial direction R so that the portion on the inside (or outside) of the tooth portions in the radial direction R and the portion on the outside (or inside) of the tooth portions in the radial direction R can be differentiated from each other in, e.g., a surface shape, a hardness, a roughness, or a friction coefficient. With this configuration, the engagement force upon fitting of the tooth portions is also greater on the inside than on the outside.

In the above-described embodiment, the case where the clutch device 10 is used for the motor unit 1 for driving, e.g., the joint of the robot has been described as an example. The clutch device according to the embodiment of the present disclosure is not limited to the motor unit, and may be mounted on an optional target having a driver. The target may include, for example, moving objects such as an automobile, an airplane, and a ship, industrial machines such as a machine tool, a construction machine, and a heavy machine, home appliances, and business equipment. The motor unit according to the embodiment of the present disclosure does not necessarily include the case 2 as in the above-described embodiment. Moreover, in the motor unit, the rotor shaft 41 of the motor 4 and the output shaft 7 are not necessarily provided parallel with each other. The gear mechanism is not limited to one including the first to third gears 51, 52, 53, and may include one or two gears or include four or more gears. Further, the gear of the gear mechanism is not limited to a spur gear, and for example, may be an internal gear, a helical gear, a screw gear, or a bevel gear.

The embodiments of the present disclosure have been described above in detail with reference to the drawings. Specific configurations of the present disclosure are not limited to these embodiments. For example, embodiments changed in design without departing from the gist of the technique of the present disclosure are also included in the technical scope of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A clutch device comprising:

an input disk to be rotated by drive force from an input side;

an output disk configured to transmit rotation of the input disk to an output side; and a biasing member configured to press the input disk and the output disk against each other, wherein the input disk and the output disk are provided so as to contact or separate from each other in an axial direction, and at opposing surfaces thereof, respectively have tooth portions engageable with or disengageable from each other in association with contact or separation of the input disk and the output disk, at each tooth portion, recessed and raised portions extending in a radial direction are alternately provided in a circumferential direction, each of the recessed and raised portions is formed in such a curved surface that a width in the circumferential direction continuously expands toward an outside in the radial direction, engagement force in the axial direction is greater on an inside of the tooth portions in the radial direction than on the outside in a state in which the tooth portions of the input disk and the output disk are fitted in each other by pressing by the biasing member, and the input disk receives the pressing force from the biasing member through an intermediate member having a higher stiffness than that of the input disk.

2. The clutch device according to claim 1, wherein
the output disk is elastically deformable by pressing force of the biasing member such that an inner portion of the output disk in the radial direction approaches the input disk.

3. The clutch device according to claim 1, wherein
the tooth portions are provided at outer peripheral portions of the input disk and the output disk, and
a hollow portion at which the input disk and the output disk separate from each other is provided on the inside of the tooth portions in the radial direction.

4. The clutch device according to claim 1, wherein
the intermediate member has a contact surface configured to surface-contact a back side of the tooth portion of the input disk to transmit the pressing force from the biasing member.

5. The clutch device according to claim 1, wherein
the output disk is coupled to an output member having a higher stiffness than that of the output disk, and
the output member is fixed to the output disk at a position apart from the tooth portion of the output disk to a center in the radial direction.

6. The clutch device according to claim 5, wherein
the output disk has an insertion hole into which the output member is to be inserted, and
the output member has a shaft portion to be inserted into the insertion hole of the output disk and an annular protruding portion protruding from the shaft portion in the radial direction to contact the output disk from an opposite side of the input disk.

7. A motor unit comprising:
a motor having a rotor shaft;
a gear mechanism configured to transmit rotation of the rotor shaft;
a driven gear to be rotated by transmission of the rotation of the rotor shaft from the gear mechanism; and
the clutch device according to claim 1, the clutch device transmitting the rotation to an output shaft on an output side from the driven gear on an input side.

* * * * *